US010359064B2

(12) United States Patent
George et al.

(10) Patent No.: US 10,359,064 B2
(45) Date of Patent: Jul. 23, 2019

(54) PROTECTIVE CLIPS FOR MOVABLE PARTITIONS AND RELATED METHODS (71) Applicant: Won-Door Corporation, Salt Lake City, UT (US)

(72) Inventors: Michael D. George, Kaysville, UT (US); E. Carl Goodman, Salt Lake City, UT (US); Craig Bell, South Jordan, UT (US); Michael Hazlett, Taylorsville, UT (US); William Michael Coleman, Salt Lake City, UT (US)

(73) Assignee: Won-Door Corporation, Salt Lake City, UT (US)

( * ) Notice: Subject to any disclaimer, the term of this patent is extended or adjusted under 35 U.S.C. 154(b) by 71 days.

(21) Appl. No.: 14/789,210

(22) Filed: Jul. 1, 2015

(65) Prior Publication Data
US 2015/0300387 A1 Oct. 22, 2015

Related U.S. Application Data (60) Division of application No. 13/294,621, filed on Nov. 11, 2011, now Pat. No. 9,074,412, which is a
(Continued)

(51) Int. Cl.
E06B 9/06 (2006.01)
F16B 2/20 (2006.01)
(Continued)

(52) U.S. Cl.
CPC ............ *F16B 2/20* (2013.01); *B29C 45/0013* (2013.01); *E06B 3/481* (2013.01); *B29C 45/00* (2013.01);
(Continued)

(58) Field of Classification Search
CPC . E06B 7/22; E06B 7/23; E06B 7/2312; E06B 7/2316; E06B 7/2305;
(Continued)

(56) References Cited

U.S. PATENT DOCUMENTS 2,892,496 A 6/1959 Stroup
2,970,642 A * 2/1961 Parsons ................. E06B 3/4618
160/40
(Continued)

FOREIGN PATENT DOCUMENTS

WO WO 2008096057 A2 * 8/2008 ........... B65D 5/0015

OTHER PUBLICATIONS

Office Action dated Feb. 3, 2011 in U.S. Appl. No. 12/423,502, filed Apr. 14, 2009, by George et al., 11 pages.
(Continued)

*Primary Examiner* — Katherine W Mitchell
*Assistant Examiner* — Jeremy C Ramsey
(74) *Attorney, Agent, or Firm* — TraskBritt (57) ABSTRACT Protective clips for movable partitions include a guard portion that protrudes from a top major surface of a base portion. The guard portion extends along the top major surface proximate to a front side of the base portion. The guard portion also may extend along the top major surface proximate to at least one end side surface at a longitudinal end of the base portion. Movable partitions include one or more such protective clips. The protective clips optionally may be used to attach a sweep strip to panels of a movable partition. Methods of forming such protective clips include molding the clips within a mold cavity.

19 Claims, 7 Drawing Sheets

Related U.S. Application Data continuation of application No. 12/423,502, filed on Apr. 14, 2009, now abandoned.

(51) Int. Cl.

| | |
|---|---|
| *E06B 3/48* | (2006.01) |
| *B29C 45/00* | (2006.01) |
| *B29K 55/02* | (2006.01) |
| *B29K 105/16* | (2006.01) |
| *B29K 509/08* | (2006.01) |
| *B29L 31/00* | (2006.01) |

(52) U.S. Cl.
CPC ...... *B29K 2055/02* (2013.01); *B29K 2105/16* (2013.01); *B29K 2509/08* (2013.01); *B29L 2031/7282* (2013.01); *E06B 9/06* (2013.01); *Y10T 24/44632* (2015.01); *Y10T 29/49826* (2015.01)

(58) Field of Classification Search
CPC .... E06B 7/2301; E06B 7/2303; E06B 7/2307; E06B 7/2309; E06B 7/231; E06B 5/113; E06B 3/88; E05D 15/264
USPC ......... 160/236; 211/126.16, 128.1, 134, 135; 49/479.1
See application file for complete search history.

(56) References Cited

U.S. PATENT DOCUMENTS

| | | | |
|---|---|---|---|
| 2,994,371 A | | 8/1961 | Morseth et al. |
| 3,205,935 A | | 9/1965 | Cayton |
| 3,234,996 A | | 2/1966 | King et al. |
| 3,380,506 A | | 4/1968 | Good et al. |
| 3,672,424 A | | 6/1972 | Brown |
| 3,854,246 A | | 12/1974 | McAllister |
| 3,955,330 A | | 5/1976 | Wendt |
| 3,994,330 A | | 11/1976 | Laby |
| 4,055,917 A | * | 11/1977 | Coller ................. E06B 1/70 49/469 |
| 4,235,049 A | * | 11/1980 | Marinoni ............ E06B 3/549 49/493.1 |
| 4,357,979 A | * | 11/1982 | Marontate .......... E06B 3/481 160/199 |
| 4,446,332 A | | 5/1984 | Dauser et al. |
| 4,545,148 A | | 10/1985 | Shaw |
| 4,922,987 A | | 5/1990 | Marontate et al. |
| 5,199,478 A | | 4/1993 | Kubota |
| 5,237,776 A | | 8/1993 | Kubota |
| 5,401,091 A | | 3/1995 | Landry |
| 5,465,532 A | | 11/1995 | Varin |
| 6,026,611 A | * | 2/2000 | Ralston ............... B60J 1/1853 49/123 |
| 6,253,493 B1 | | 7/2001 | Sauve |
| 6,269,591 B1 | | 8/2001 | Kelly |
| 6,332,294 B1 | | 12/2001 | Carranza et al. |
| 6,371,188 B1 | | 4/2002 | Baczuk et al. |
| 6,397,522 B1 | | 6/2002 | Nussbaum |
| 7,003,916 B2 | | 2/2006 | Nestell et al. |
| 7,062,881 B2 | | 6/2006 | Rissone |
| 7,427,096 B2 | | 9/2008 | Snider et al. |
| 7,584,574 B2 | | 9/2009 | Kinross et al. |
| 8,297,334 B2 | | 10/2012 | Chu |
| 8,739,472 B2 | | 6/2014 | Moss |
| 2005/0039639 A1 | * | 2/2005 | Espenschied ........ A47B 23/002 108/25 |
| 2007/0151179 A1 | | 7/2007 | Speyer et al. |
| 2007/0175121 A1 | | 8/2007 | Speyer et al. |
| 2007/0204553 A1 | * | 9/2007 | Bunker, II .............. E06B 3/365 52/716.1 |
| 2007/0234657 A1 | | 10/2007 | Speyer et al. |
| 2010/0132766 A1 | * | 6/2010 | Jenkins ................. F24J 2/5211 136/251 |
| 2010/0025779 A1 | | 10/2010 | George et al. |
| 2010/0257793 A1 | | 10/2010 | George et al. |
| 2011/0203746 A1 | | 8/2011 | Smart |
| 2012/0138242 A1 | * | 6/2012 | Kondash ............ E05D 15/0621 160/202 |

OTHER PUBLICATIONS

Office Action dated Jul. 22, 2011 in U.S. Appl. No. 12/423,502, filed Apr. 14, 2009, by George et al., 14 pages.
Office Action dated Jan. 26, 2012 in U.S. Appl. No. 12/423,502, filed Apr. 14, 2009, by George et al., 12 pages.
Office Action dated Mar. 26, 2012 in U.S. Appl. No. 13/294,641, filed Nov. 11, 2011, by George et al., 21 pages.
Office Action dated Mar. 22, 2012 in U.S. Appl. No. 13/294,621, filed Nov. 11, 2011, by George et al., 19 pages.
Office Action dated Jun. 28, 2012 in U.S. Appl. No. 12/423,502, filed Apr. 14, 2009 by George et al., 19 pages.
Office Action dated Aug. 17, 2012 in U.S. Appl. No. 13/294,641, filed Nov. 11, 2011, by George et al., 23 pages.
Office Action dated Aug. 22, 2012 in U.S. Appl. No. 13/294,621, filed Nov. 11, 2011, by George et al., 22 pages.
Office Action dated Dec. 19, 2012 in U.S. Appl. No. 12/423,502, filed Apr. 14, 2009 by George et al., 18 pages.
Office Action dated May 2, 2014 in U.S. Appl. No. 12/423,502, filed Apr. 14, 2009, by George et al., 12 pages.
Office Action dated May 21, 2013 in U.S. Appl. No. 12/423,502, filed Apr. 14, 2009, by George et al., 11 pages.
Office Action dated Oct. 2, 2013 in U.S. Appl. No. 12/423,502, filed Apr. 14, 2009, by George et al., 12 pages.
Office Action dated Nov. 6, 2014 in U.S. Appl. No. 13/294,621, filed Nov. 11, 2011, by George et al., 31 pages.
Office Action dated Nov. 6, 2014 in U.S. Appl. No. 13/294,641, filed Nov. 11, 2011, by George et al., 32 pages.

* cited by examiner

PROTECTIVE CLIPS FOR MOVABLE PARTITIONS AND RELATED METHODS

CROSS-REFERENCE TO RELATED APPLICATIONS

This application is a divisional of U.S. patent application Ser. No. 13/294,621, filed Nov. 11, 2011, now U.S. Pat. No. 9,074,412, issued Jul. 7, 2015, which application is a continuation of U.S. patent application Ser. No. 12/423,502, filed Apr. 14, 2009, the disclosure of each of which is hereby incorporated herein in its entirety by this reference.

This application is related to U.S. patent application Ser. No. 13/294,641, filed Nov. 11, 2011, now U.S. Pat. No. 9,068,392, issued Jun. 30, 2015.

TECHNICAL FIELD

Embodiments of the present invention are directed to movable partitions that may be used to partition a relatively larger space into two or more relatively smaller spaces, to protective clips that may be attached to such partitions, and to methods of forming such partitions and protective clips.

BACKGROUND

Movable partitions are utilized in numerous situations and environments for a variety of purposes. Such partitions may include, for example, a movable partition comprising foldable or collapsible doors configured to enclose or subdivide a room or other area. Often such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security and/or fire barrier. In such a case, the partition barrier may be configured to automatically close upon the occurrence of a predetermined event such as the actuation of an associated alarm. For example, one or more accordion or similar folding-type partitions may be used as a security and/or a fire barrier wherein each partition is formed with a plurality of panels connected to one another with hinges. The hinged connection of the panels allows the partition to fold and collapse into a compact unit for purposes of storage when not deployed. Thus, the partition may be stored, for example, in a pocket formed in the wall of a building when in a retracted or folded state. When deployment of the partition is required to subdivide a single large room into multiple smaller rooms, secure an area during a fire, or for any other specified reason, the partition may be deployed along a track, which is often located above the door in a header, until the partition extends a desired distance across the room.

In some applications, it is desirable to provide a seal along the peripheral edges of the movable partition to improve the efficacy of the partition as one or more of a visual barrier, a noise barrier, a barrier to smoke or fire, a climate barrier, and a security barrier.

For example, it is known to attach an extruded strip of polymer material to the bottom of a movable partition such that the polymer material extends between the lower edge of the movable partition and the surface of the floor below the movable partition. The strip of polymer material is attached to the lower edge of the movable partition and is sized and configured to contact the surface of the floor, but is not attached to the floor. Thus, as the movable partition is moved relative to the floor, the strip of polymer material sweeps across the surface of the floor. As a result, those in the art often refer to such strips of polymer material as a "sweep" or a "sweep strip."

It is known to attach a sweep strip to the lower edge of a movable partition using a plurality of clips, which are often referred to in the art as "sweep clips." For example, on partitions that include a plurality of panels attached to one another by hinges, a clip may be attached to the lower end of each panel, and the sweep strip may be attached to each of a plurality of the sweep clips. Each sweep clip may be provided with a feature having a geometry that is complementary to the geometry of a feature provided on the sweep strip. Thus, the features on a plurality of sweep clips may be engaged with the complementary feature on the sweep strip to attach the sweep strip to the sweep clips and, hence, to the lower edge of the movable partition.

Figure 1A:
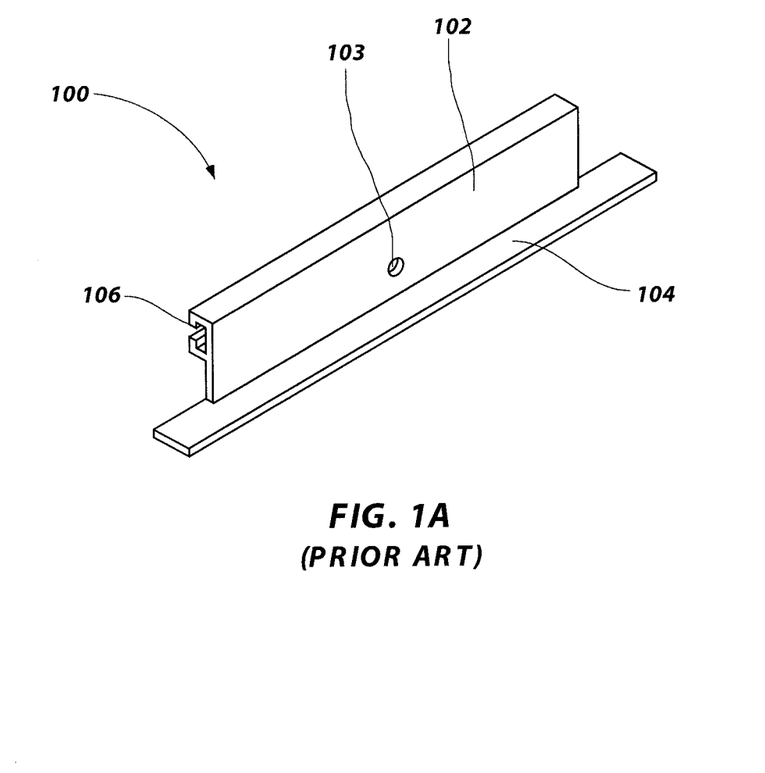
FIGS. 1A and 1B show a perspective view and a side plan view, respectively, of an extruded aluminum clip for attaching a sweep strip to a panel of a movable partition.
Figure 1B:
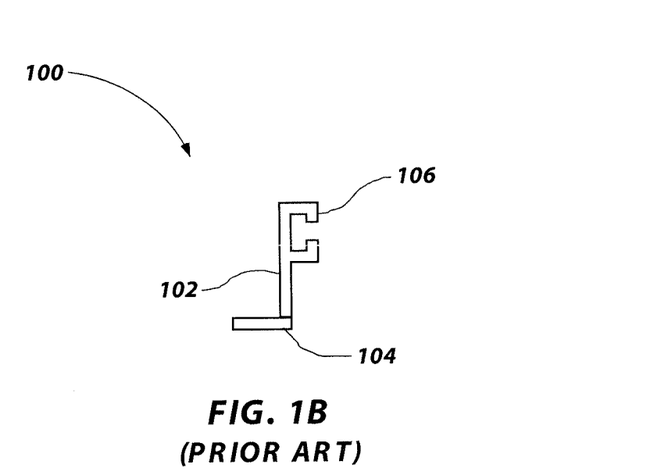

FIGS. 1A and 1B illustrate an example of a sweep clip 100 like those currently used in the art. As previously mentioned, a sweep clip 100 may be attached to each of a plurality of panels of a movable partition. The clip 100 has a back portion 102 that is used to attach the clip 100 to a panel of a movable partition. For example, one or more apertures 103 may be formed through the back portion 102, and one or more fasteners (e.g., rivets, bolts, or screws) (not shown) used to attach the clip 100 to a panel may extend through the apertures 103 (and through corresponding holes in the panel to which the clip 100 is attached). The clip 100 also has a base portion 104 that abuts against and at least partially covers a bottom surface of the panel to which it is attached. A feature 106 is provided on a surface of the back portion 102 of the clip 100 opposite the panel (when the clip 100 is attached to the panel). The feature 106 is configured to engage with a complementary feature on a sweep strip and is used to attach the sweep strip to the clip 100 and, hence, to the panel to which the sweep clip 100 is coupled. For example, the feature 106 may comprise one or more protrusions extending from the back portion 102 that define a channel therebetween that extends longitudinally along the back portion 102 across the clip 100. The channel may have a T-shaped cross-sectional geometry. The sweep strip may be provided with a protrusion or "tongue" having a cross-sectional geometry substantially similar to the T-shaped geometry of the channel of the feature 106 on the clip 100, such that the tongue of the sweep strip may be slid into the groove of the feature 106 on the clip 100 to attach the sweep strip to the clip 100.

The clip 100 may comprise an aluminum alloy material, and may be formed using an extrusion process. For example, aluminum alloy may be extruded through an aperture in a die having a cross-sectional shape substantially similar to the transverse cross-sectional shape of the clip 100 (as shown in FIG. 1B). After the extrusion process, the clip 100 may be further machined as necessary or desirable.

BRIEF SUMMARY

In one embodiment, the present invention includes a protective clip for a movable partition. The protective clip includes an elongated and generally planar base portion and a guard portion. The elongated and generally planar base portion includes a top major surface, a bottom major surface, a front side surface, a back side surface, and two side surfaces at each of the longitudinal ends of the base portion. The guard portion protrudes from the top major surface of the base portion in a direction substantially perpendicular to the base portion. The guard portion extends along a section of the top major surface in proximity to the front side surface of the base portion and along a section of the top major surface in proximity to at least one of the side surfaces at each of the longitudinal ends of the base portion.

In another embodiment, the present invention includes a movable partition. The movable partition includes at least one panel and at least one protective clip coupled to the at least one panel. The protective clip includes an elongated and generally planar base portion and a guard portion. The base portion abuts with at least one of a bottom surface of the at least one panel and a top surface of the at least one panel. The guard portion protrudes from the base portion in a direction substantially perpendicular to the base portion. The guard portion covers at least a portion of a surface adjacent to at least one of the bottom surface of the at least one panel and the top surface of the at least one panel.

In yet another embodiment, the present invention includes a method of forming a protective clip for a movable partition. The method includes abutting a plurality of mold parts to form an injection molding cavity and shaping the injection molding cavity to form a protective clip. Shaping the injection molding cavity includes forming an elongated and generally planar base portion and forming a guard portion protruding from the base portion in a direction substantially perpendicular to the base portion. The method further includes injecting a polymeric material into the injection molding cavity.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the description of embodiments of the invention when read in conjunction with the accompanying drawings, in which:

DETAILED DESCRIPTION

Illustrations presented herein are not meant to be actual views of any particular device or system, but are merely idealized representations that are employed to describe embodiments of the present invention. Additionally, elements common between figures may retain the same numerical designation.

Figure 2A:
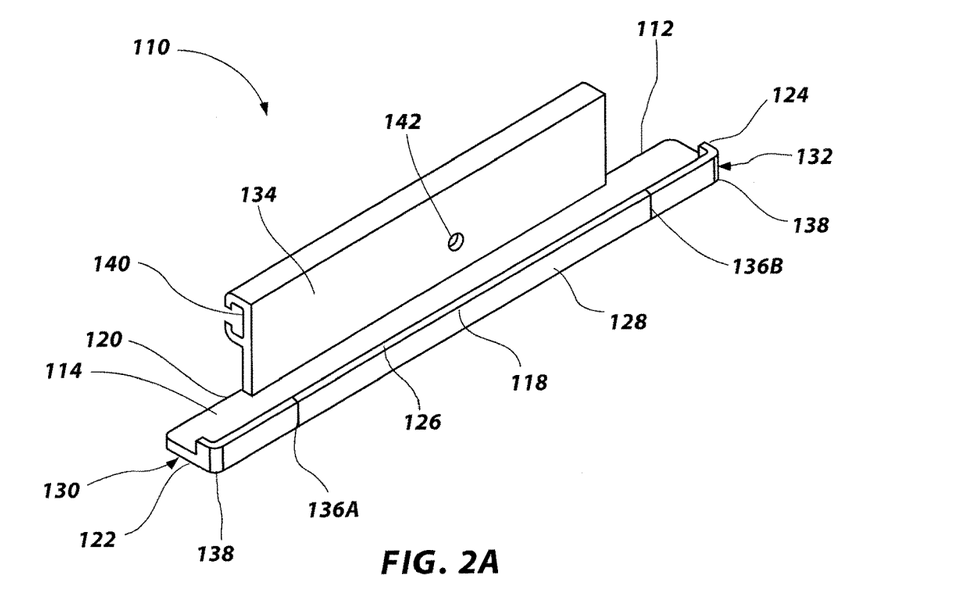
FIG. 2A is a perspective view of an embodiment of a protective clip of the present invention that may be used to attach a sweep strip to a panel of a movable partition.
Figure 2B:
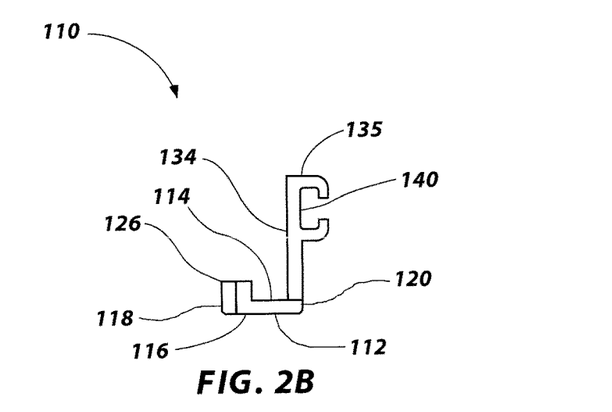
FIG. 2B is a side plan view of the protective clip shown in FIG. 2A.

An embodiment of a protective clip 110 is shown in FIGS. 2A through 2D. Referring to FIGS. 2A and 2B, the protective clip 110 includes an elongated and generally planar base portion 112. The base portion 112 includes a top major surface 114, a bottom major surface 116, a front side surface 118, a back side surface 120, a first end side surface 122, and a second end side surface 124. The first end side surface 122 is disposed at a first longitudinal end 130 of the protective clip 110, and the second end side surface 124 is disposed at an opposite, second longitudinal end 132 of the protective clip 110.

Figure 2C:
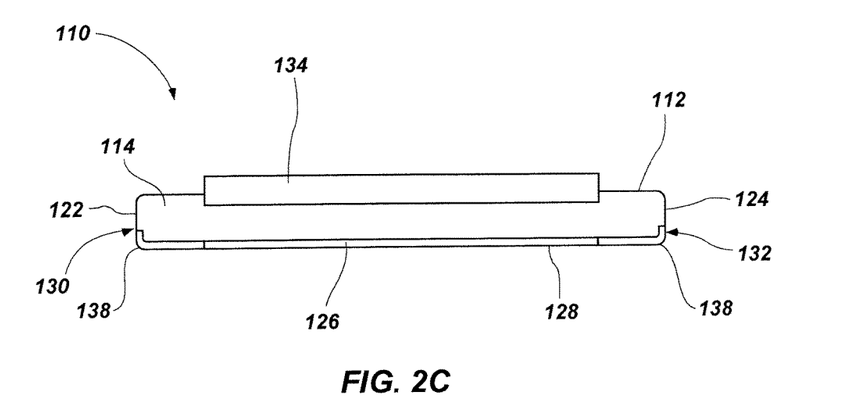
FIG. 2C is a top plan view of the protective clip shown in FIG. 2A.

The protective clip 110 also includes a guard portion 126 that is configured to guard or protect one or more corners or edges of a panel to which the protective clip 110 is attached, as discussed in further detail herein below. As shown in FIG. 2A, the guard portion 126 protrudes from the top major surface 114 of the base portion 112 in a direction substantially perpendicular to the generally planar base portion 112. As shown in FIGS. 2A and 2C, the guard portion 126 may be configured as a rail that extends along the top major surface 114 proximate (e.g., adjacent) the front side surface 118 of the base portion 112, around corners 138 of the base portion 112, and along the top major surface 114 proximate (e.g., adjacent) the first end side surface 122 and the second end side surface 124 of the base portion 112. In other words, the guard portion 126 may extend along at least a section of a peripheral edge 128 of the top major surface 114. The guard portion 126 may extend along the peripheral edge 128 of the top major surface 114 adjacent a portion of the first end side surface 122, around a corner 138, adjacent the front side surface 118, around another corner 138, and adjacent a portion of the second end side surface 124.

In some embodiments, the guard portion 126 may extend adjacent only a portion of the first end side surface 122 and the second end side surface 124, which may provide clearance for a hinge attached to a panel when the protective clip 110 is attached to the panel.

Edges and corners of the protective clip 110 may be rounded (e.g., radiused). For example, the corners 138 between the front side surface 118 and each of the first end side surface 122 and the second end side surface 124 may be rounded to a radius of between about 0.075 inch (approximately 1.905 millimeters) and about 0.125 inch (approximately 3.175 millimeters). By rounding the corners 138, injuries that might occur when the foot of a person abuts or rubs against a corner 138 may be reduced or substantially eliminated.

Figure 2D:
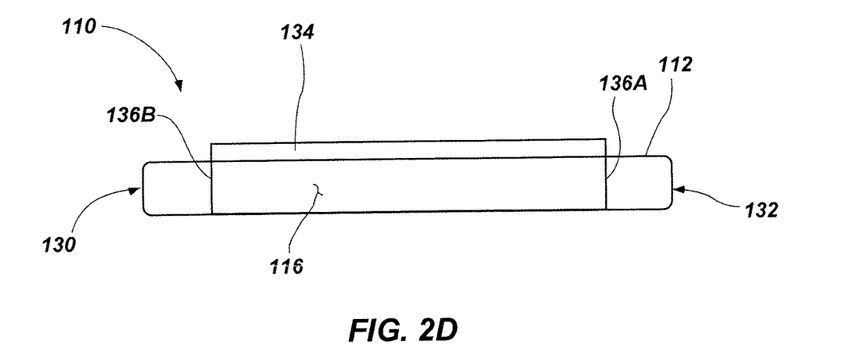
FIG. 2D is a bottom plan view of the protective clip shown in FIG. 2A.

As shown in FIGS. 2A and 2D, the protective clip 110 may also include recesses 136A, 136B (e.g., V-shaped or U-shaped notches) that are located and configured to allow each of the first longitudinal end 130 and the second longitudinal end 132 of the base portion 112 (and any section of the guard portion 126 attached thereto) to be snapped off (manually or mechanically) as necessary or desirable upon assembly of a movable partition including the protective clip 110. For example, as shown in FIG. 2D, a first recess 136A may be formed transversely across the bottom major surface 116 of the base portion 112 proximate the first longitudinal end 130, and a second recess 136B may be formed transversely across the bottom major surface 116 of the base portion 112 proximate the second longitudinal end 132. Optionally, the first recess 136A and the second recess 136B may further extend across the front side surface 118 and the guard portion 126, as shown in FIG. 2A, as well as across the back side surface 120. The first and second recesses 136A, 136B may facilitate the fracture of the base portion 112 at the locations of the first and second recesses 136A, 136B when the base portion 112 is flexed or bent about the first and second recesses 136A, 136B.

Referring to FIGS. 2A and 2B, in addition to the base portion 112 and the guard portion 126, the protective clip 110 also includes a back portion 134 that extends from the base portion 112 proximate the back side surface 120 thereof. The back portion 134 may extend from the top major surface 114 of the base portion 112 in a direction substantially perpendicular to the base portion 112. The back portion 134 may extend along the top major surface 114 proximate at least a section of the back side surface 120 of the base portion 112. The back portion 134 may be configured for attaching the protective clip 110 to a movable partition. For example, the back portion 134 of the protective clip 110 may be attached to a panel of a movable partition using one or more fasteners such as rivets, screws, or bolts (not shown). The protective clip 110 may include a hole 142 to facilitate the use of such a fastener to attach the protective clip 110 to an associated structure. In additional embodiments, the back portion 134 of the protective clip 110 may be attached to a panel of a movable partition using an adhesive.

Figure 4A:
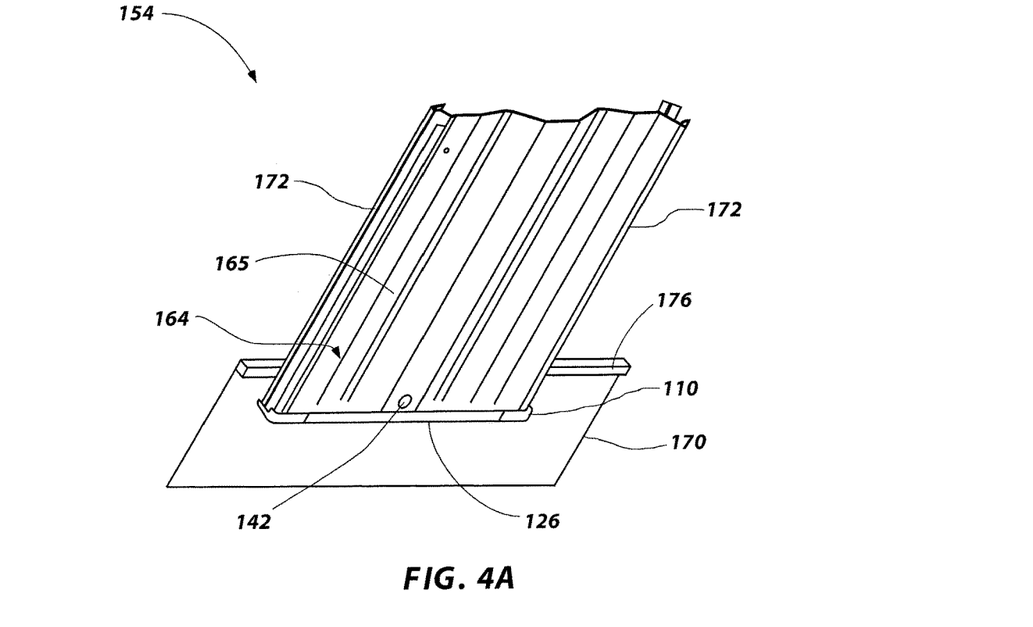
FIG. 4A is a front perspective view of a portion of the movable partition shown in FIG. 3 and illustrates a portion of a panel, a sweep strip, and the protective clip used to attach the sweep strip to the panel.

As shown in FIG. 2B, the back portion 134 may be configured for attachment to a sweep strip 170 (FIG. 4A). For example, the back portion 134 may include a feature 135 for attaching a sweep strip to the protective clip 110. The feature 135 is configured to engage with a complementary feature on a sweep strip 170 (FIG. 4A) and is used to attach the sweep strip 170 to the protective clip 110. For example, the feature 135 may comprise one or more protrusions extending from the back portion 134 that define a channel 140 therebetween that extends longitudinally along the back portion 134 across the protective clip 110. The channel 140 may have a T-shaped cross-sectional geometry. The sweep strip 170 may be provided with a complementary feature 176 such as a protrusion or "tongue" having a cross-sectional geometry substantially similar to the T-shaped geometry of the channel 140 defined by the feature 135 on the protective clip 110, such that the complementary feature 176 of the sweep strip 170 may be slid into the channel 140 to attach the sweep strip 170 to the protective clip 110.

It is noted that, while the embodiment of the protective clip 110 shown and described herein is configured such that the sweep strip 170 (FIG. 4A) is attached to the back portion 134 of the protective clip 110, in other embodiments of the present invention, the sweep strip 170 may be attached to another portion of the protective clip 110 such as, for example, to a bottom major surface 116 of the base portion 112.

The protective clip 110 may be manufactured from and comprise materials such as polymeric materials, composite materials, and metal materials. As non-limiting examples, the protective clip 110 may be manufactured from and comprise a polymeric material such as an acrylonitrile butadiene styrene (ABS) material or a polyvinyl chloride (PVC) material. Such polymer materials also may include a filler material such as, for example, glass particles (e.g., whiskers). In additional embodiments, the protective clip 110 may comprise a metal material such as, for example, aluminum, an aluminum-based alloy material, iron, or an iron-based alloy material.

The protective clip 110 shown in FIGS. 2A-2D may be manufactured using a molding process such as, for example, an injection molding process. In an injection molding process, a mold may be formed that includes a mold cavity having a geometry complementary to that of the protective clip 110 such that the protective clip 110 may be formed by injecting material into the mold cavity. The mold may comprise a plurality of mold parts (e.g., two mold halves), and recesses may be formed into the adjoining surfaces of the mold parts such that the mold cavity is defined by the recess surfaces in the various mold parts when they are assembled together. The mold cavity may be shaped to form a protective clip 110. In other words, the mold cavity within the mold may be shaped to include a portion corresponding to the base portion 112, another portion corresponding to the guard portion 126, and another portion corresponding to the back portion 134 of the protective clip 110. After shaping the mold cavity, material (e.g., a molten polymer material) may be injected into the mold cavity to form the protective clip 110. Injection molding systems suitable for use in forming embodiments of protective clips 110 of the present invention are commercially available.

Figure 3:
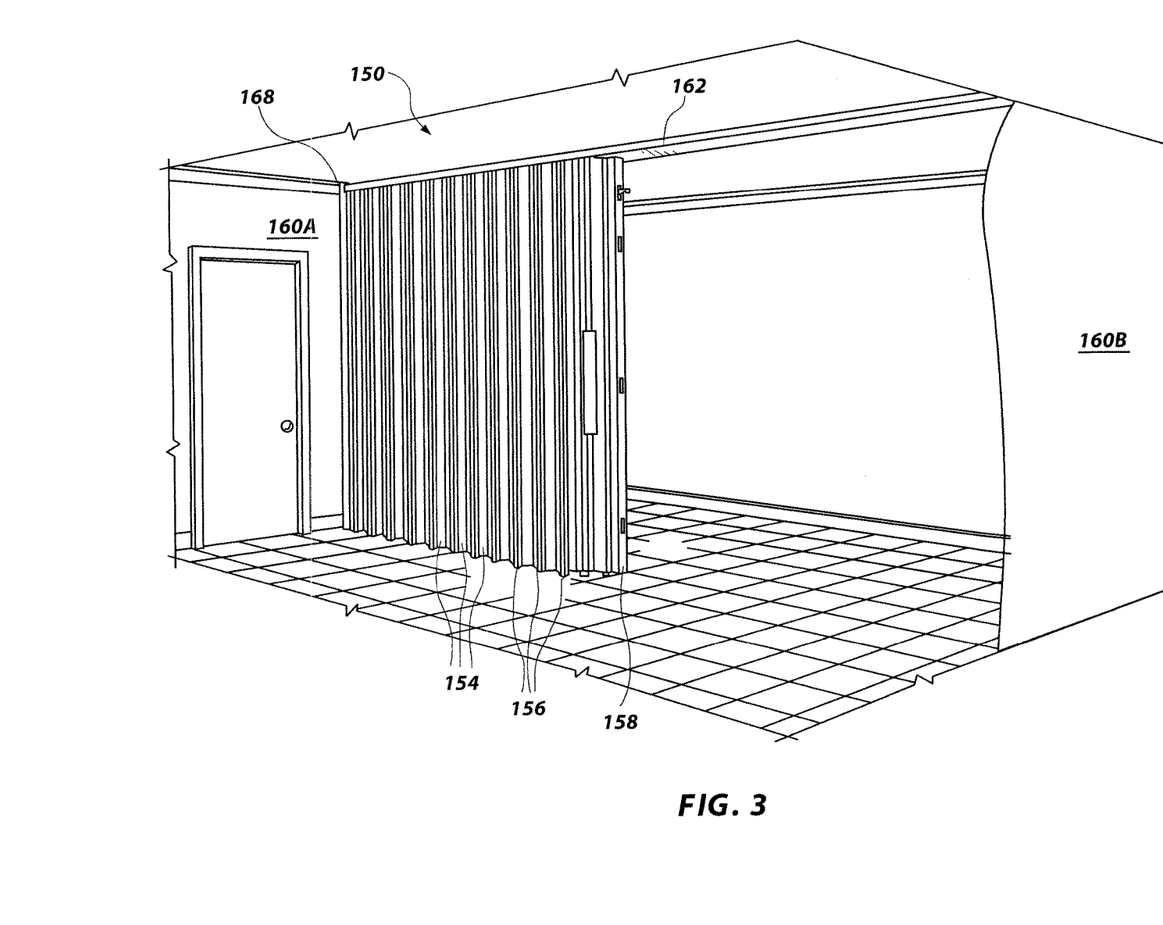
FIG. 3 is a perspective view of an embodiment of a movable partition of the present invention that includes a protective clip like that shown in FIG. 2A.

FIG. 3 is a perspective view of an embodiment of a movable partition 150 of the present invention that includes a plurality of protective clips 110 like that shown in FIGS. 2A-2D. As shown in FIG. 3, the movable partition 150 includes a plurality of generally rigid panels 154 that are coupled together in accordion fashion using polymeric hinge members 156. The movable partition 150 is engaged with (e.g., suspended from) an overhead track 162 along which the movable partition 150 moves as the movable partition 150 is expanded (i.e., closed) and retracted (i.e., opened).

The movable partition 150 may be used, for example, to subdivide a relatively larger space into relatively smaller spaces (e.g., rooms or areas). In other embodiments, the movable partition 150 may be used as a barrier (e.g., a security barrier and/or a fire barrier). The hinged connection of the panels 154 allows the movable partition 150 to be compactly stored in a pocket 168 formed in a wall 160A of a building, if desirable, when in a retracted or folded state.

To deploy the movable partition 150 to an extended position, the movable partition 150 is moved along the overhead track 162. A leading edge of the movable partition 150 may include a lead post 158 configured to engage with a door jamb or another post, which may be provided in a wall 160B of a building to which the movable partition 150 may extend in an extended state. While the embodiment of the movable partition 150 shown and described with reference to FIG. 3 contains a single accordion-type door, additional embodiments of the present invention may include multiple doors. For example, a partition may include two doors (e.g., accordion-type doors) configured to extend across a space and join together to partition a space.

FIG. 4A is a front perspective view of a portion of the movable partition 150 shown in FIG. 3 and illustrates a portion of a panel 154, a sweep strip 170, and a protective clip 110 used to attach the sweep strip 170 to the panel 154.

The protective clip 110 is attached to the lower end 164 of the panel 154 such that the base portion 112 of the protective clip 110 abuts against the bottom surface (not visible in FIG. 4A) of the panel 154. Furthermore, the guard portion 126 of the protective clip 110 extends upward adjacent a portion of the front major surface 165 of the panel 154, such that the edge defined by the intersection between the front major surface 165 of the panel 154 and the bottom surface of the panel 154 is covered by the protective clip 110 and is not exposed in a manner that could injure the foot of a person in any significant manner. The guard portion 126 of the protective clip 110 also extends around corners at the lower end 164 of the panel 154, such that the corners defined by the intersection between the front major surface 165 of the panel 154, the bottom surface of the panel 154, and the side surfaces of the panel 154 are covered by the protective clip 110 and are not exposed in a manner that could injure the foot of a person in any significant manner.

Figure 4B:
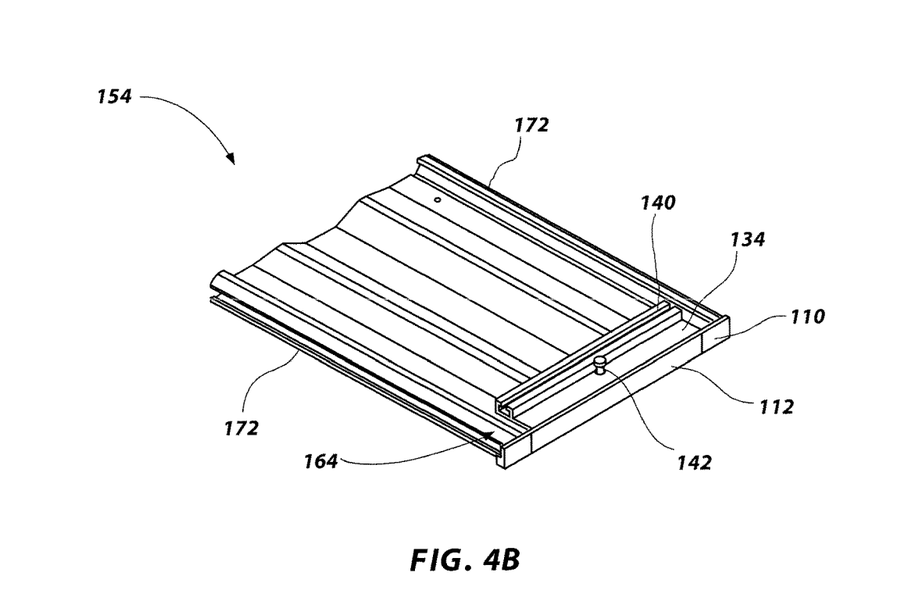
FIG. 4B is a back perspective view of a portion of the movable partition shown in FIG. 3 and illustrates the protective clip attached to a panel of the movable partition.

FIG. 4B is a back perspective view of a portion of the movable partition 150 shown in FIG. 3 and illustrates the protective clip 110 attached to a panel 154 of the movable partition 150. The sweep strip 170 is not shown in FIG. 4B to facilitate depiction of the protective clip 110.

As shown in FIG. 3, the plurality of panels 154 are connected to one another with polymeric hinge members 156. Referring again to FIGS. 4A and 4B, in order to receive the hinge members 156 (FIG. 3), each of the panels 154 may include a hinge retainer 172 extending along each side of the panel 154. The base portion 112 and the guard portion 126 of the protective clip 110 may at least partially cover the edges of these hinge retainers 172 at the lower end 164 of the panel 154. The guard portion 126, however, may be configured to provide clearance for the hinge members 156 when the hinge members 156 are disposed in the hinge retainers 172.

Thus, the guard portion 126 of the protective clip 110 protects the feet of persons standing adjacent the partition 150 from injuries that could potentially be caused by exposed edges and corners at the lower end 164 of the panel 154.

Figure 5A:
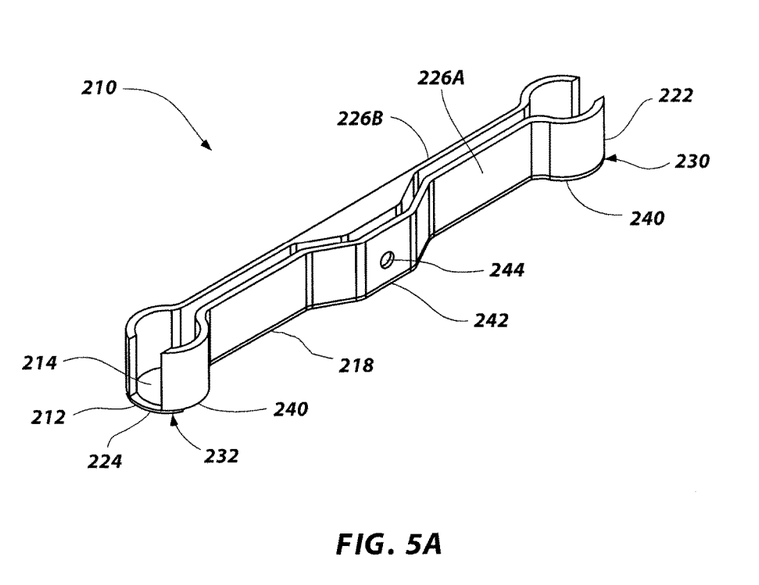
FIG. 5A is a perspective view of another embodiment of a protective clip of the present invention.
Figure 5B:
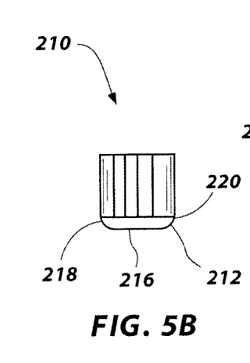
FIG. 5B is a side plan view of the protective clip shown in FIG. 5A.
Figure 5C:
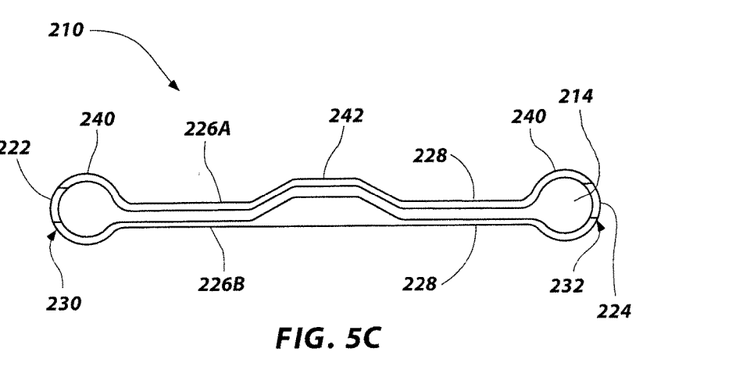
FIG. 5C is a top plan view of the protective clip shown in FIG. 5A.

Another embodiment of a protective clip 210 of the present invention is illustrated in FIGS. 5A-5C. The protective clip 210 includes an elongated and generally planar base portion 212. The base portion 212 includes a top major surface 214, a bottom major surface 216, a front side surface 218, a back side surface 220, a first end side surface 222, and a second end side surface 224. The first end side surface 222 is disposed at a first longitudinal end 230 of the base portion 212, and the second end side surface 224 is disposed at a second longitudinal end 232 of the base portion 212.

The base portion 212 may also include a substantially circular end portion 240 at the first longitudinal end 230, and another substantially circular end portion 240 at the second longitudinal end 232 of the base portion 212. Additionally, the base portion 212 may include a middle portion 242 between the substantially circular end portion 240 at the first longitudinal end 230 and the substantially circular end portion 240 at the second longitudinal end 232 of the base portion 212.

The protective clip 210 may also include a front guard portion 226A and a back guard portion 226B. The front guard portion 226A protrudes from the top major surface 214 of the base portion 212 in a direction substantially perpendicular to the base portion 212. The front guard portion 226A extends along a section of the top major surface 214 of the base portion 212 proximate the front side surface 218 of the base portion 212. Similarly, the back guard portion 226B also protrudes from the top major surface 214 of the base portion 212 in a direction substantially perpendicular to the base portion 212. The back guard portion 226B extends along a section of the top major surface 214 of the base portion 212 proximate to the back side surface 220 of the base portion 212. Additionally, the front guard portion 226A and the back guard portion 226B may also extend along a section of the top major surface 214 proximate to the first end side surface 222 and the second end side surface 224 at the first and second longitudinal ends 230, 232 of the base portion 212. In some embodiments, the front guard portion 226A and the back guard portion 226B may extend continuously along a peripheral edge 228 of the top major surface 214. A gap may be provided between the front guard portion 226A and the back guard portion 226B at the first longitudinal end 230 of the base portion 212 and at the second longitudinal end 232 of the base portion 212 to provide clearance for hinge members 156 (not shown), as previously discussed with reference to FIGS. 3, 4A, and 4B.

In some embodiments, the front guard portion 226A and the back guard portion 226B may also be configured for attaching the protective clip 210 to a panel of a movable partition. For example, the protective clip 210 may include a feature such as a hole 244 configured to receive a fastener (e.g., a rivet, screw, or bolt) therethrough.

Figure 6:
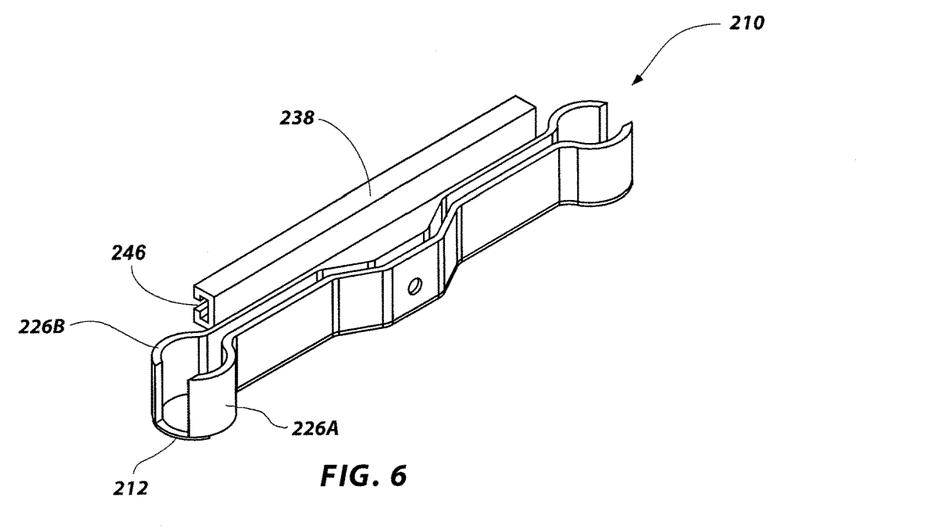
FIG. 6 is a perspective view of another embodiment of a protective clip of the present invention that may be used to attach a sweep strip to a panel of a movable partition.
Figure 7:
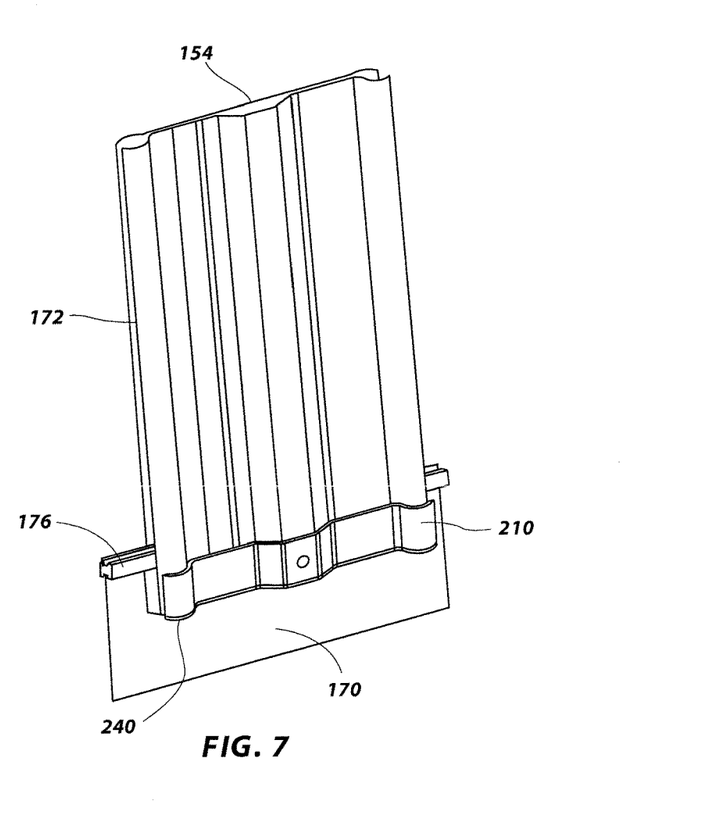
FIG. 7 is a perspective view of a portion of another embodiment of a movable partition of the present invention that includes a protective clip like that shown in FIG. 6 used to attach a sweep strip to a panel of the movable partition.

As shown in FIGS. 6 and 7, the protective clip 210 may also include a back portion 238. The back portion 238 may be separately formed and attached to the protective clip 210 (e.g., attached to the back guard portion 226B), or the back portion 238 may be integrally formed with, and comprise an integral part of, the protective clip 210. The back portion 238 may also be configured for attachment to a sweep strip 170 (FIG. 7), as previously described in relation to the back portion 134 of the protective clip 110 shown in FIGS. 2A-2D. For example, the back portion 238 may include a channel 246 configured to receive a complementary feature 176 (e.g., a protrusion) on a sweep strip 170.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A protective clip for use with a movable partition comprising a collapsible door for installation in a building to partition a space within the building, the protective clip comprising:

a body comprising an injection molded elastomer material configured to be coupled to at least one panel of a movable partition, the injection molded elastomer material of the body comprising:

an elongated base portion having a width and a length that is greater than the width, the elongated base portion having a first longitudinal end positioned at a first furthest extent of the length of the elongated base portion and a second longitudinal end at a second furthest extent of the length, the first furthest extent of the length opposing the second furthest extent of the length, the elongated base portion configured to abut with a bottom surface of the at least one panel, the base portion comprising:

a first side surface extending in a direction transverse to the length and positioned at the first longitudinal end of the base portion;
a second side surface extending in the direction transverse to the length and positioned at the second longitudinal end of the base portion opposite the first side surface;
a back side surface of the base portion extending between the first side surface and the second side surface;
a top major surface of the base portion; and
a guard portion protruding from a top major surface of the base portion in a direction substantially perpendicular to the base portion, a first section of the guard portion protruding directly from the top major surface of the base portion and extending along at least a portion the length of the base and a second section of the guard portion protruding directly from the top major surface of the base portion and abutting the first section at a first intersection of the front side surface and the first side surface and a second intersection of the front side surface and the second side surface and extending along a portion of the width on the first side surface and the second side surface of the base portion in a direction away from an entirety of the first section of the guard portion and in a direction toward the back side surface of the base portion, wherein the second section comprises two distinct structures that extend only along the first side surface and the second side surface,
wherein the guard portion is configured to cover a portion of a front major surface of the at least one panel, cover a portion of a first corner of the at least one panel extending between the front major surface and a first side surface of the at least one panel, and cover a portion of a second corner of the at least one panel extending between the front major surface and a second side surface of the at least one panel opposite the first side surface,
wherein at least a majority of the top major surface of the base portion along the first side surface is free of any structure protruding from the top major surface of the base portion along the first side surface and at least a majority of the top major surface of the base portion along the second side surface is free of any structure protruding from the top major surface of the base portion along the second side surface, and
wherein the top major surface of the base portion at a first intersection of the back side surface and the first side surface and a second intersection of the back side surface and the second side surface is free of any structure protruding from the top major surface.

2. The protective clip of claim 1, wherein:
a majority of the first side surface is planar and perpendicular to a longitudinal front side surface of the base portion;
a majority of the second side surface is planar and perpendicular to the longitudinal front side surface of the base portion; and
the guard portion extends along only a portion of the first side surface of the base portion, along at least a portion of a front side surface of the base portion, and along only a portion of the second side surface of the base portion.

3. The protective clip of claim 1, wherein the protective clip is configured to cover a bottom surface of at least one hinge retainer extending along at least a portion of a peripheral side edge of the at least one panel.

4. The protective clip of claim 3, wherein the guard portion is configured to provide clearance for a hinge member disposed in the at least one hinge retainer.

5. The protective clip of claim 1, further comprising a back portion protruding from the base portion in a direction substantially perpendicular to the base portion, the back portion extending along at least a section of the base portion, and wherein the protective clip is configured to be coupled to the at least one panel at the back portion.

6. The protective clip of claim 5, wherein the back portion comprises a sweep attachment feature configured to attach a portion of a sweep to the protective clip.

7. A method of forming the protective clip of claim 1 for a movable partition, the method comprising:
abutting a plurality of mold parts to form an injection molding cavity defining geometry corresponding to the protective clip; and
injecting a polymeric material into the injection molding cavity, comprising:
forming the elongated base portion of the protective clip; and
forming the guard portion of the protective clip protruding from the base portion in a direction substantially perpendicular to the base portion.

8. The method of claim 7, wherein injecting the polymeric material comprises injecting a glass filled acrylonitrile butadiene styrene (ABS) into the injection molding cavity.

9. A protective clip for use with a movable partition comprising a collapsible door for installation in a building to partition a space within the building, the protective clip comprising:
a body configured to be coupled to at least one panel of a movable partition, the body comprising:
an elongated and generally planar base portion comprising:
a first side surface at a first longitudinal end of the base portion;
a second side surface at a second longitudinal end of the base portion opposite the first side surface;
a front side surface extending between the first side surface and the second side surface;
a top major surface of the base portion;
a bottom major surface of the base portion; and
a back side surface of the base portion extending between the first side surface and the second side surface, the back side surface opposing the front side surface, wherein the front side surface and the back side surface are both longer than the first side surface and the second side surface; and
a guard portion protruding from the top major surface of the base portion in a direction substantially perpendicular to the base portion, the guard portion having a first section protruding from the top major surface of the base portion and extending along at least a portion of the front side surface of the base portion and a second section protruding from the top major surface of the base portion and extending from the front side surface along only a minor portion of the first side surface of the base portion and extending from the front side surface along only a minor portion of the second side surface of the base portion, wherein the second section only extends along the first side surface and the second side surface and does not extend between the first side surface and the second side surface, wherein a remaining portion of the top major surface of the base portion along the first side surface adjacent the guard portion is planar with the top major surface, and wherein corners of the base portion positioned between the back side surface and each of the first side surface and the second side surface are free of any structure protruding from the top major surface of the base portion.

10. The protective clip of claim 9, wherein at least a majority of the top major surface of the base portion along the first side surface is free of the guard portion and at least a majority of the top major surface of the base portion along the second side surface is free of the guard portion.

11. The protective clip of claim 9, wherein:
the first side surface comprises a first radiused corner extending from the front side surface to the first side surface; and
the second side surface comprises a second radiused corner extending from the front side surface to the second side surface, wherein the guard portion extends along the first radiused corner and the second radiused corner.

12. The protective clip of claim 11, wherein a first terminal end of the guard portion is positioned proximate the first radiused corner and a second terminal end of the guard portion is positioned proximate the second radiused corner.

13. The protective clip of claim 9, further comprising a back portion protruding from the base portion and comprising a sweep attachment feature configured to attach a portion of a sweep to the protective clip.

14. The protective clip of claim 13, wherein the protective clip is configured to be coupled to the at least one panel at the back portion.

15. The protective clip of claim 9, wherein the guard portion extends along an entirety of the front side surface of the base portion.

16. The protective clip of claim 9, further comprising a back portion protruding from the base portion and comprising a sweep attachment channel configured to attach a portion of a sweep to the protective clip, wherein the base portion extends from a first side of the back portion and the sweep attachment channel extends from a second side of the back portion that opposes the first side.

17. The protective clip of claim 16, wherein the protective clip is configured to be physically attached and secured to the at least one panel only at the back portion.

18. The protective clip of claim 16, wherein lateral sides of the back portion of the protective clip are sized to extend only to an interior portion of the at least one panel spaced from each lateral side of the at least one panel.

19. A protective clip for use with a movable partition comprising a collapsible door for installation in a building to partition a space within the building, the protective clip comprising:
a body comprising an injection molded elastomer material and configured to be coupled to at least one panel of a movable partition, the body further comprising:
an elongated and generally planar base portion comprising:
a first side surface at a first longitudinal end of the base portion;
a second side surface at a second longitudinal end of the base portion opposite the first side surface;
a front side surface extending between the first side surface and the second side surface;
a top major surface of the base portion;
a bottom major surface of the base portion; and
a back side surface of the base portion; and
a guard portion protruding from the top major surface of the base portion in a direction substantially perpendicular to the base portion, the guard portion extending from the front side surface along only a minor portion of the first side surface of the base portion, along at least a portion of the front side surface of the base portion, and from the front side surface along only a minor portion of the second side surface of the base portion, wherein at least a majority of the top major surface of the base portion along the first side surface is free of any structure protruding from the top major surface of the base portion along the first side surface, and wherein the top major surface of the base portion between a terminal end of the guard portion along the first side surface and a first intersection of the back side surface and the first side surface and second and between another terminal end of the guard portion along the second side surface and a second intersection of the back side surface and the second side surface is free of any structure protruding from the top major surface.

* * * * *

UNITED STATES PATENT AND TRADEMARK OFFICE
CERTIFICATE OF CORRECTION

PATENT NO.        : 10,359,064 B2                          Page 1 of 1
APPLICATION NO.   : 14/789210
DATED             : July 23, 2019
INVENTOR(S)       : Michael D. George et al.

It is certified that error appears in the above-identified patent and that said Letters Patent is hereby corrected as shown below:

In the Claims
Claim 1,    Column 9,    Line 18,    change "the base and" to --the base portion and--
Claim 1,    Column 9,    Line 21,    change "of the front side" to --of a front side--

Signed and Sealed this
Seventeenth Day of September, 2019

Andrei Iancu
*Director of the United States Patent and Trademark Office*